United States Patent
Putnam et al.

(10) Patent No.: US 11,274,783 B1
(45) Date of Patent: Mar. 15, 2022

(54) SURE-SEAL CLEANOUT CONDUIT VALVE ASSEMBLIES AND METHODS

(71) Applicants: David A. Putnam, Calhoun, LA (US); Steve E. Moore, Calhoun, LA (US)

(72) Inventors: David A. Putnam, Calhoun, LA (US); Steve E. Moore, Calhoun, LA (US)

(*) Notice: Subject to any disclaimer, the term of this patent is extended or adjusted under 35 U.S.C. 154(b) by 0 days.

(21) Appl. No.: 16/458,332

(22) Filed: Jul. 1, 2019

(51) Int. Cl.
  *F16L 55/115* (2006.01)
  *E03F 9/00* (2006.01)
  *E03F 7/02* (2006.01)

(52) U.S. Cl.
  CPC .............. *F16L 55/1152* (2013.01); *E03F 7/02* (2013.01); *E03F 9/00* (2013.01)

(58) Field of Classification Search
  CPC ......... F16L 55/1152; E03F 9/00; F16K 15/03; Y10T 137/7902
  See application file for complete search history.

(56) References Cited

U.S. PATENT DOCUMENTS

| | | | |
|---|---|---|---|
| 2,383,482 A * | 8/1945 | Hirshstein | E03F 5/042 137/527.6 |
| 2,882,923 A * | 4/1959 | Smolensky | E03F 7/04 137/515.5 |
| 4,063,570 A | 12/1977 | Mitchell et al. | |
| 4,546,789 A | 10/1985 | Taylor | |
| 4,850,059 A | 7/1989 | Dickerson | |
| 5,031,659 A * | 7/1991 | Gonzales | E03F 7/04 137/360 |
| 6,199,576 B1 | 3/2001 | Young | |
| 6,474,365 B1 | 11/2002 | Brown et al. | |
| 9,157,227 B2 | 10/2015 | Savaria | |
| 9,725,894 B2 | 8/2017 | Caux et al. | |
| 10,240,705 B1 | 3/2019 | Zamkochyan | |

* cited by examiner

*Primary Examiner* — Reinaldo Sanchez-Medina
*Assistant Examiner* — Nicole Gardner
(74) *Attorney, Agent, or Firm* — R. Keith Harrison

(57) ABSTRACT

Cleanout conduit valve assemblies for a cleanout conduit may include a vertically oriented valve housing. The valve housing may include a valve inlet end configured to be disposed in fluid communication with the cleanout conduit and a valve discharge end opposite to and generally above the valve inlet end. The valve discharge end may be oriented within a valve discharge plane disposed at a discharge angle of greater than 0 degrees with respect to a horizontal plane. The valve discharge end may have an upper discharge opening side and a lower discharge opening side sloped downwardly from the upper discharge opening side. A valve body may be pivotally carried by the valve housing at the upper discharge opening side of the valve discharge end. Methods of preventing precipitation and runoff on a ground surface from entering a cleanout conduit connected to a sewer service line are also disclosed.

20 Claims, 9 Drawing Sheets

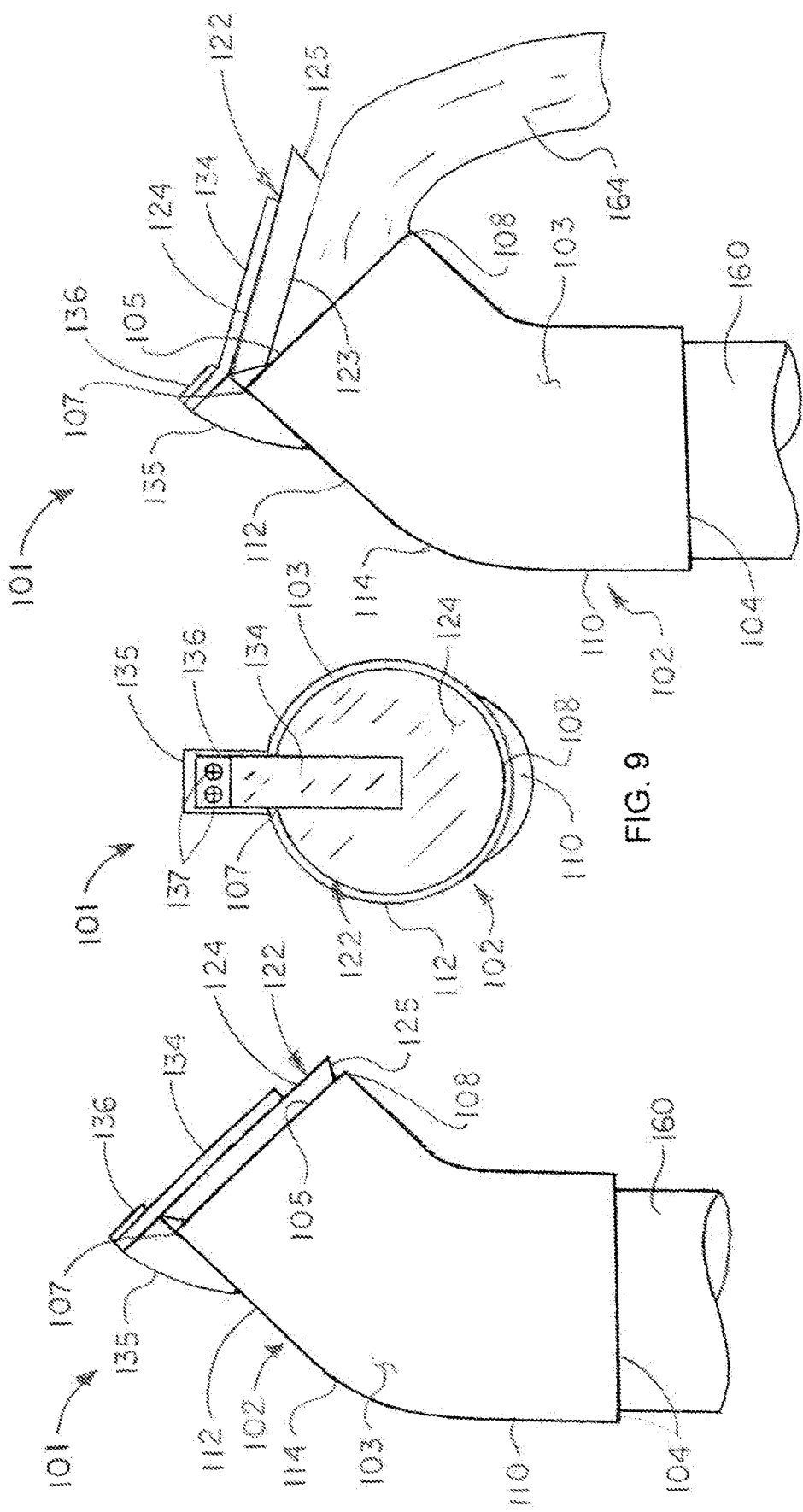

SURE-SEAL CLEANOUT CONDUIT VALVE ASSEMBLIES AND METHODS

FIELD

Illustrative embodiments of the disclosure generally relate to cleanout conduits for sewer service lines. More particularly, illustrative embodiments of the disclosure relate to sure-seal cleanout conduit valve assemblies and methods which reliably prevent rainwater and other precipitation and runoff on a ground surface from entering a cleanout conduit connected to a sewer service line.

BACKGROUND

The background description provided herein is solely for the purpose of generally presenting the context of the illustrative embodiments of the disclosure. Aspects of the background description are neither expressly nor impliedly admitted as prior art against the claimed subject matter.

Homes, businesses and other buildings typically include a sewer service line which connects the sewage system of the building to a municipal sewer line. A cleanout conduit may extend from the sewer service line to facilitate cleaning and removal of clogs and debris from the sewer service line. The cleanout conduit may include a relief valve having a valve body. The valve body may normally be spring-loaded in a closed position to prevent entry of rainwater and other precipitation and runoff into the cleanout conduit and deployable to an open position. In the event of a blockage in the sewer service line between the cleanout conduit and the municipal sewer line, the open relief valve may facilitate overflow of sewage from the cleanout conduit to prevent backflow of the sewage through the cleanout conduit and sewer service line into the sewage system of the building.

A standard or conventional relief valve in a sewer service line has a discharge end which is oriented in a horizontal plane. The valve body is spring-loaded in the closed position to seal the discharge end. Responsive to flow of the overflow sewage from the cleanout conduit into the relief valve, the valve body opens to facilitate discharge of the overflow sewage. Upon termination of overflow sewage flow, the valve body returns to the closed position to prevent entry of precipitation and runoff into the relief valve and cleanout conduit.

One of the limitations of standard or conventional relief valves is that the horizontal orientation of the discharge end frequently causes paper and other debris to collect around the discharge end. Consequently, the valve body fails to close completely and inadequately seals the discharge opening at the discharge end. This may allow precipitation and runoff to enter the relief valve, potentially resulting in overflow of the relief valve onto the ground surface and potential entry of the overflow sewage into the building, particularly under heavy precipitation conditions.

Accordingly, sure-seal cleanout conduit valve assemblies and methods which reliably prevent rainwater and other precipitation and runoff on a ground surface from entering a cleanout conduit connected to a sewer service line may be desirable for some applications.

SUMMARY

Illustrative embodiments of the disclosure are generally directed to cleanout conduit valve assemblies for a cleanout conduit. An illustrative embodiment of the cleanout conduit valve assemblies may include a vertically oriented valve housing. The valve housing may have a valve inlet end configured to be disposed in fluid communication with the cleanout conduit and a valve discharge end opposite to and generally above the valve inlet end. The valve discharge end may be oriented within a valve discharge plane disposed at a discharge angle of greater than 0 degrees with respect to a horizontal plane. The valve discharge end may have an upper discharge opening side and a lower discharge opening side sloped downwardly from the upper discharge opening side. A valve body may be pivotally attached to the valve housing at the upper discharge opening side of the valve discharge end.

Illustrative embodiments of the disclosure are further generally directed to methods of preventing precipitation and runoff on a ground surface from entering a cleanout conduit connected to a sewer service line. An illustrative embodiment of the methods may include obtaining a cleanout conduit valve assembly and coupling the cleanout conduit valve assembly to the cleanout conduit. The cleanout conduit valve assembly may include a vertically oriented valve housing. The valve housing may have a valve inlet end and a valve discharge end opposite to and generally above the valve inlet end. The valve discharge end may be oriented within a valve discharge plane disposed at a discharge angle of greater than 0 degrees with respect to a horizontal plane. The valve discharge end may have an upper discharge opening side and a lower discharge opening side sloped downwardly from the upper discharge opening side. A valve body may be pivotally carried by the valve housing at the upper discharge opening side of the valve discharge end.

BRIEF DESCRIPTION OF THE DRAWINGS

Illustrative embodiments of the disclosure will now be described, by way of example, with reference to the accompanying drawings, in which:

FIG. 8 is a side view of an alternative illustrative embodiment of the sure-seal cleanout conduit valve assemblies, mounted on a cleanout conduit (partially in section), with the valve body in a closed position;

FIG. 9 is a top view of the illustrative sure-seal cleanout conduit valve assembly illustrated in FIG. 8;

FIG. 10 is a side view of the illustrative sure-seal cleanout conduit valve assembly illustrated in FIG. 8, with the valve body in an open position as overflow sewage flows from the valve assembly in typical application thereof;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower". "left", "rear". "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
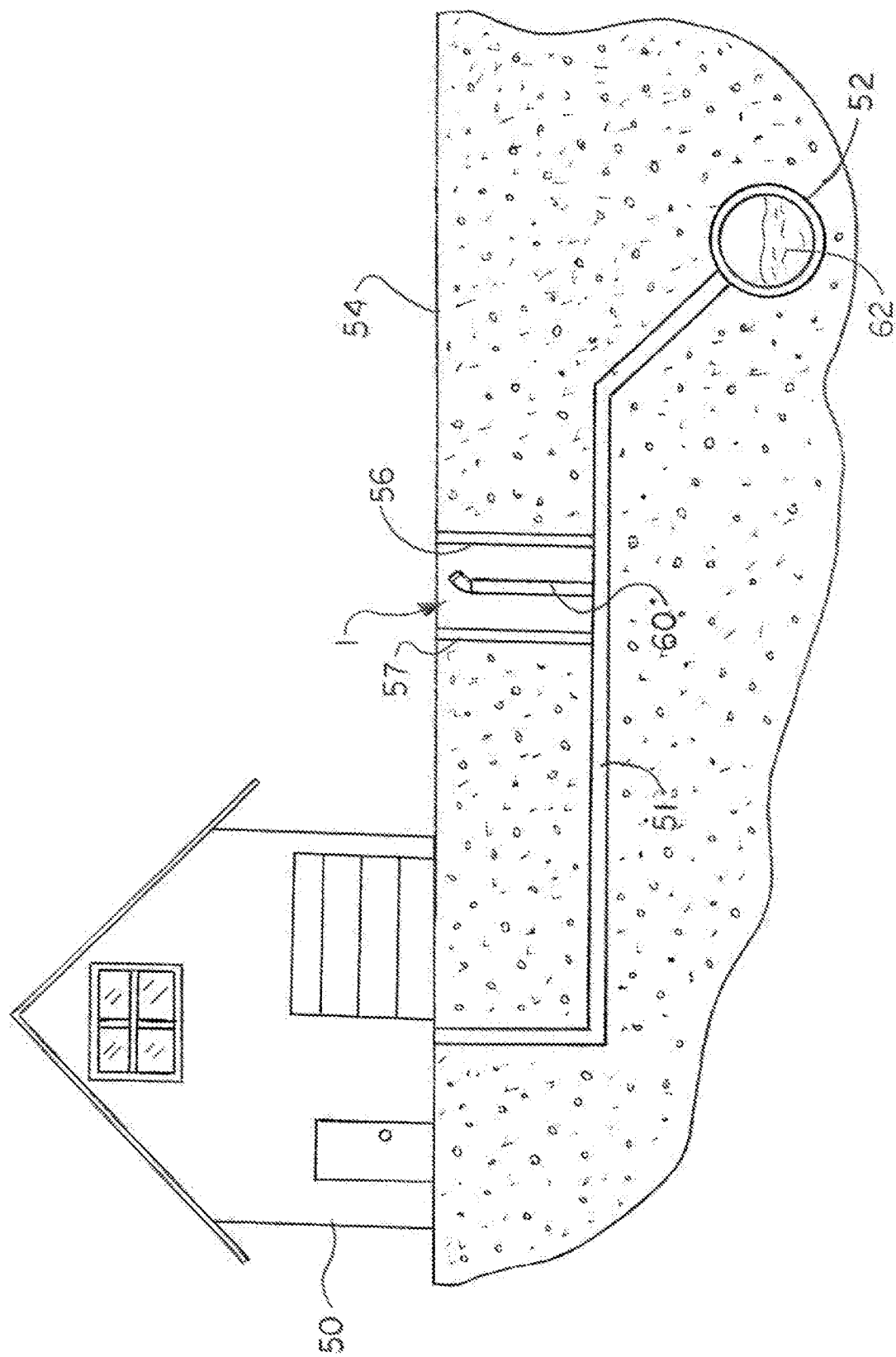
FIG. 1 illustrates a typical sewer service line connecting a building to a municipal service line and a cleanout conduit extending from the sewer service line, with an illustrative embodiment of the sure-seal cleanout conduit valve assemblies in the cleanout conduit in typical application thereof.

Referring initially to FIG. 1 of the drawings, an illustrative embodiment of the cleanout conduit valve assemblies, hereinafter valve assembly, is generally indicated by reference numeral 1. As will be hereinafter further described, the valve assembly 1 may be provided in fluid communication with respect to a cleanout conduit 60 connected to a sewer service line 51 to prevent rainwater and other precipitation and runoff on a ground surface 54 from entering the cleanout conduit 60. The sewer service line 51 may connect the sewage system (not illustrated) of a home, office or other building 50 to a municipal sewer line 52. In some applications, the cleanout conduit 60 may be oriented vertically in a subterranean cleanout conduit hole 56 which descends from the ground surface 54 and may have a lining 57. The cleanout conduit 60 may facilitate periodic cleaning and removal of clogs and debris from the sewer service line 51, typically in the conventional manner.

In the event of a blockage (not illustrated) in the sewer service line 51 between the cleanout conduit 60 and the municipal sewer line 52, the valve assembly 1 may facilitate overflow of sewage from the cleanout conduit 60 typically into the cleanout conduit hole 56. The valve assembly 1 may thus prevent backflow of the sewage through the cleanout conduit 60 and sewer service line 51 into the sewage system of the building 50. The valve assembly 1 may additionally maintain a liquid-tight seal on the cleanout conduit 60 to reliably prevent precipitation and runoff on the ground surface 54 from entering the cleanout conduit 60 and consequent overflow of sewage from the cleanout conduit 60 and the cleanout conduit hole 56 onto the ground surface 54, particularly under heavy precipitation conditions.

Figure 2:
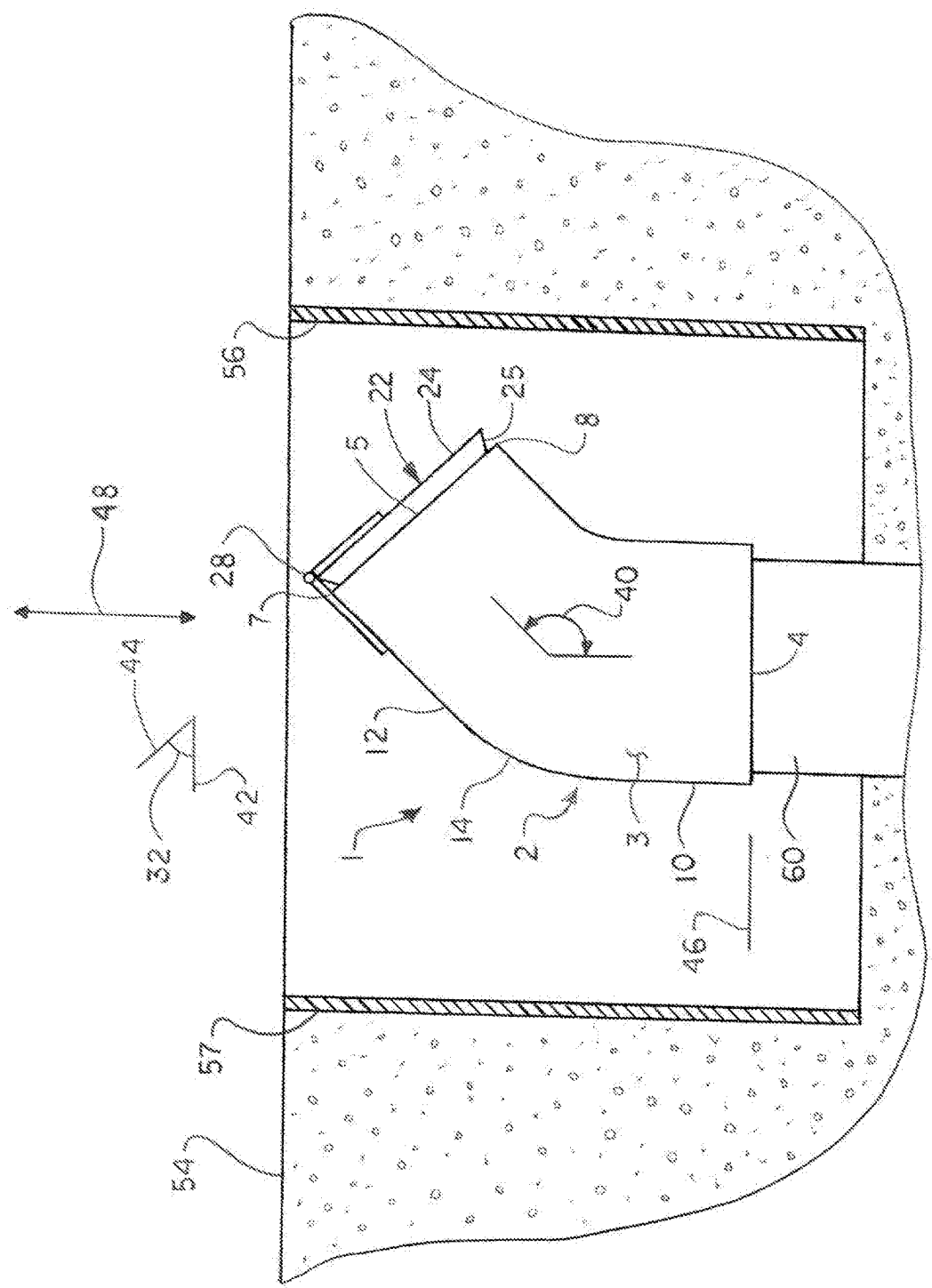
FIG. 2 is a side view of the illustrative sure-seal cleanout conduit valve assembly on the cleanout conduit, with the valve body of the cleanout conduit valve assembly disposed in the closed position.

Referring next to FIGS. 2-7 of the drawings, the valve assembly 1 may include a vertically oriented valve housing 2. As illustrated in FIG. 2, in typical application of the valve assembly 1, the valve housing 2 may be generally oriented along a vertical longitudinal valve body axis 48. The valve housing 2 may include a valve housing wall 3 having a valve inlet end 4 and a valve discharge end 5 which is opposite to and generally above the valve inlet end 4. The valve inlet end 4 may be configured to be disposed in fluid communication with the cleanout conduit 60 (FIG. 1) according to the knowledge of those skilled in the art. Accordingly, as illustrated in FIG. 3, in some embodiments, interior housing threads 18 may be provided in the valve housing wall 3 of the valve housing 2 to facilitate threaded attachment of the valve housing 2 to the cleanout conduit 60 by engagement with companion exterior cleanout conduit threads 61. In other embodiments, the valve housing 2 may be molded and/or otherwise fabricated in one piece with the cleanout conduit 60 according to the knowledge of those skilled in the art.

Figure 3A:
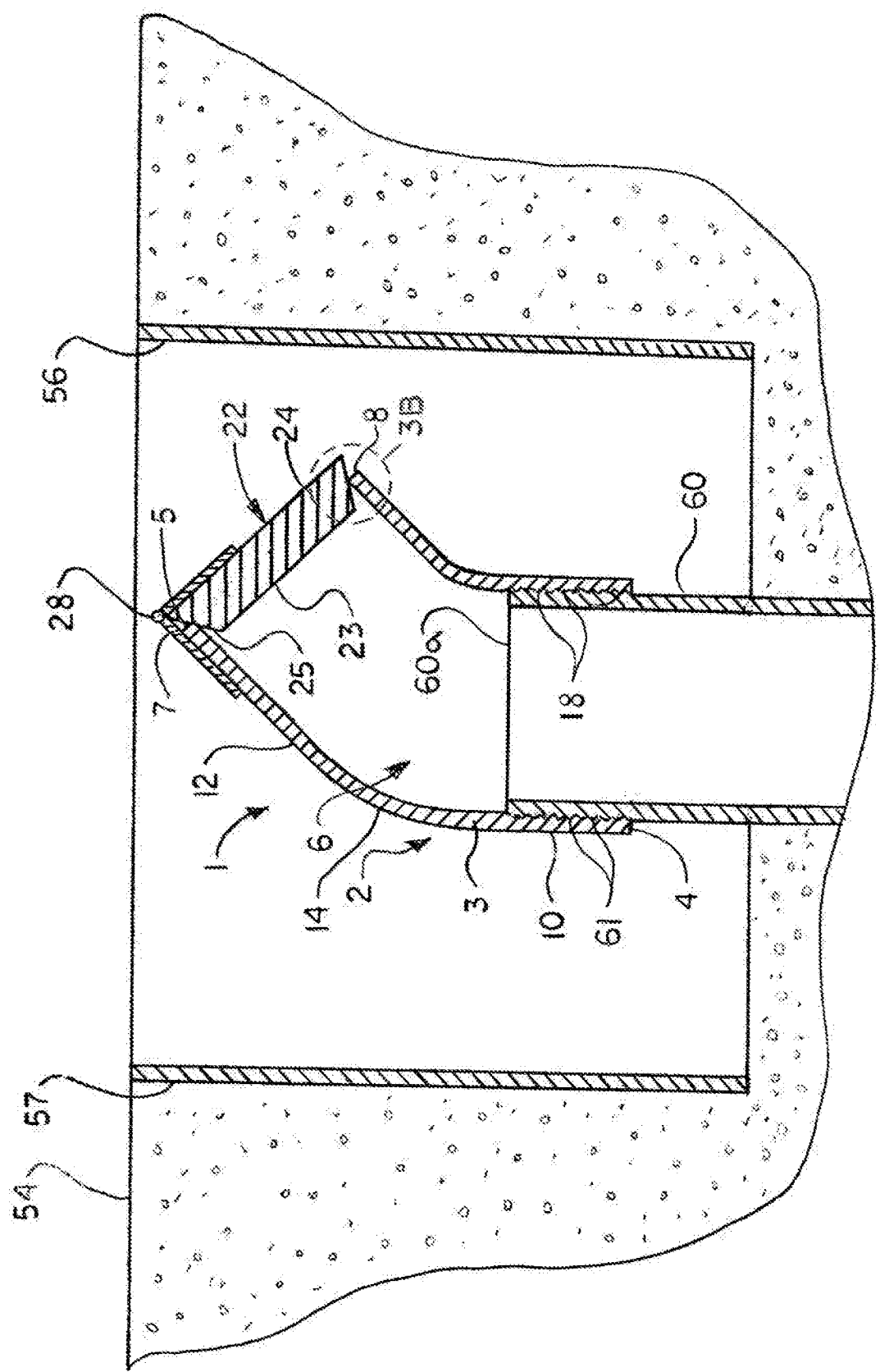
FIG. 3A is a longitudinal sectional view of the illustrative sure-seal cleanout conduit valve assembly illustrated in FIG. 2 and the cleanout conduit.
Figure 3B:
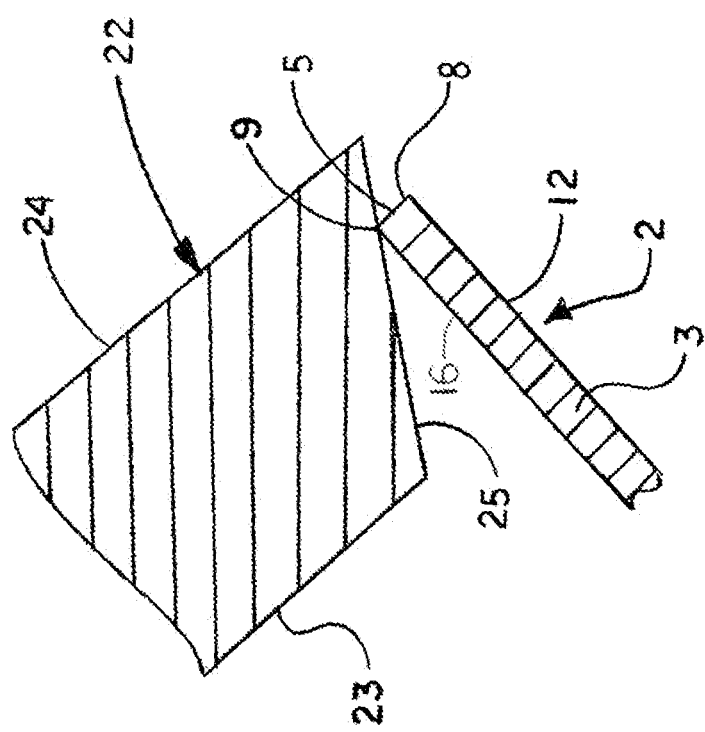
FIG. 3B is an enlarged sectional view taken along section line 3B in FIG. 3A.

As illustrated in FIG. 2, the valve discharge end 5 of the valve housing 2 may be oriented within a valve discharge plane 44 which may be disposed at a discharge angle 32 with respect to a horizontal plane 42. In some applications or embodiments, the valve inlet end 4 of the valve housing 2 may be disposed within a horizontal valve inlet plane 46. The valve discharge end 5 may have an upper discharge opening side 7 and a lower discharge opening side 8 which is sloped downwardly from the upper discharge opening side 7. As illustrated in FIG. 3B, the valve discharge end 5 of the discharge housing segment 12 of the valve housing wall 3 may have an inner wall edge 9. The valve discharge end 5 may be disposed in perpendicular relationship to an interior valve housing wall surface 16 of the valve housing wall 3. Accordingly, the inner wall edge 9 may define a sharp transition between the valve discharge end 5 and the interior valve housing wall surface 16.

The discharge angle 32 of the valve discharge end 5 may be any angle which is greater than 0 degrees. Preferably, the discharge angle 32 is at least about 10 degrees. More preferably, the discharge angle 32 is from about 35 degrees to about 55 degrees. Most preferably, the discharge angle 32 is 45 degrees but may be as great as 90 or more degrees.

The valve housing wall 3 of the valve housing 2 may include an inlet housing segment 10. A discharge housing segment 12 may be disposed at an obtuse angle 40 (FIG. 2) to the inlet housing segment 10. An angled intermediate housing segment 14 may connect the discharge housing segment 12 to the inlet housing segment 10. Accordingly, the valve inlet end 4 may terminate the inlet housing segment 10, and the valve discharge end 5 may terminate the discharge housing segment 12 of the valve housing 2. As illustrated in FIG. 3, a valve interior 6 may extend from the valve inlet end 4 to the valve discharge end 5. In some embodiments, the valve housing wall 3 may include polyvinylchloride (PVC), although other materials may additionally or alternatively be used.

Figure 7:
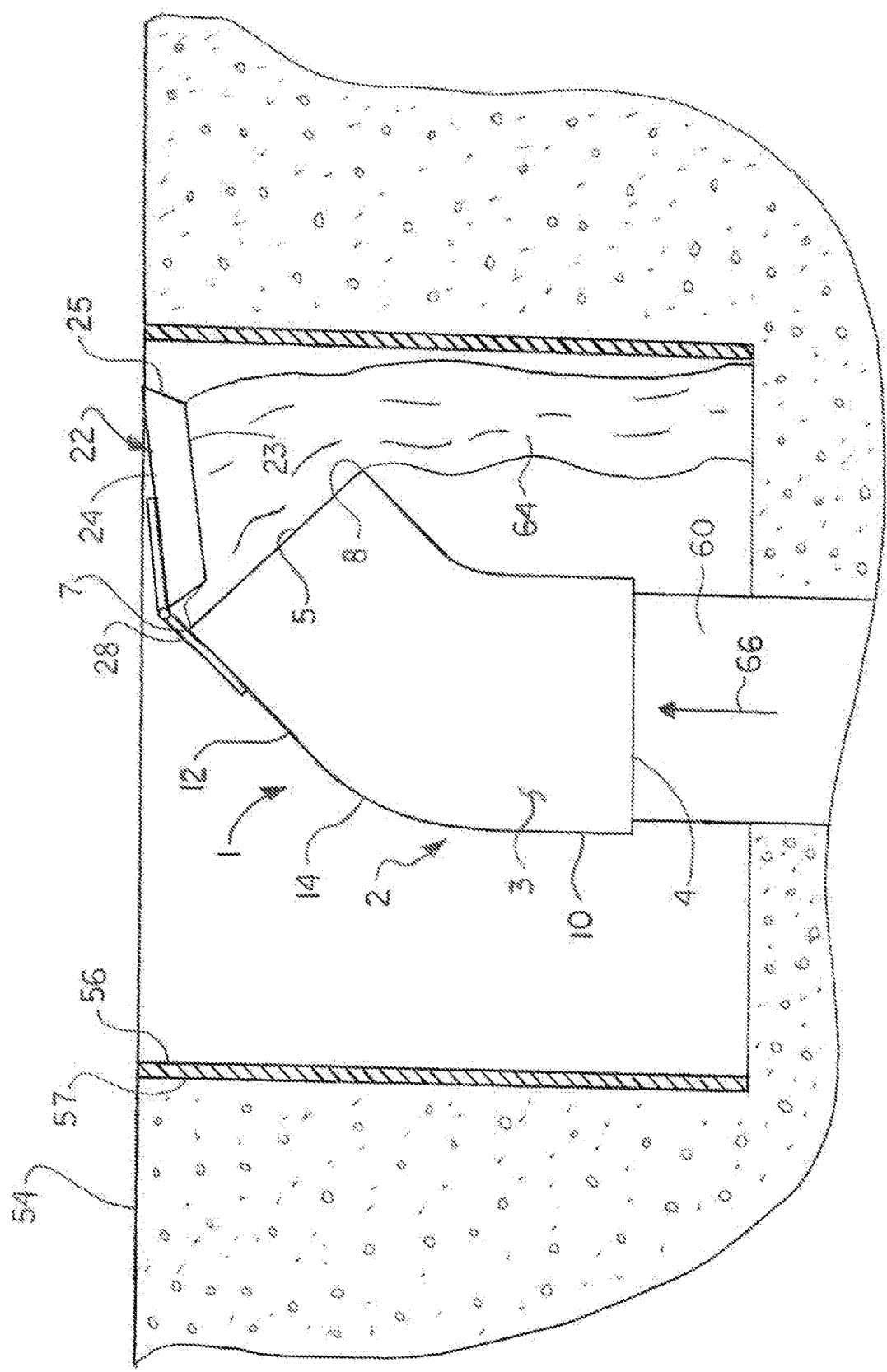
FIG. 7 is a side view of the illustrative sure-seal cleanout conduit valve assembly on the cleanout conduit, with the valve body in an open position as overflow sewage flows from the valve assembly in typical application thereof.
Figure 11:
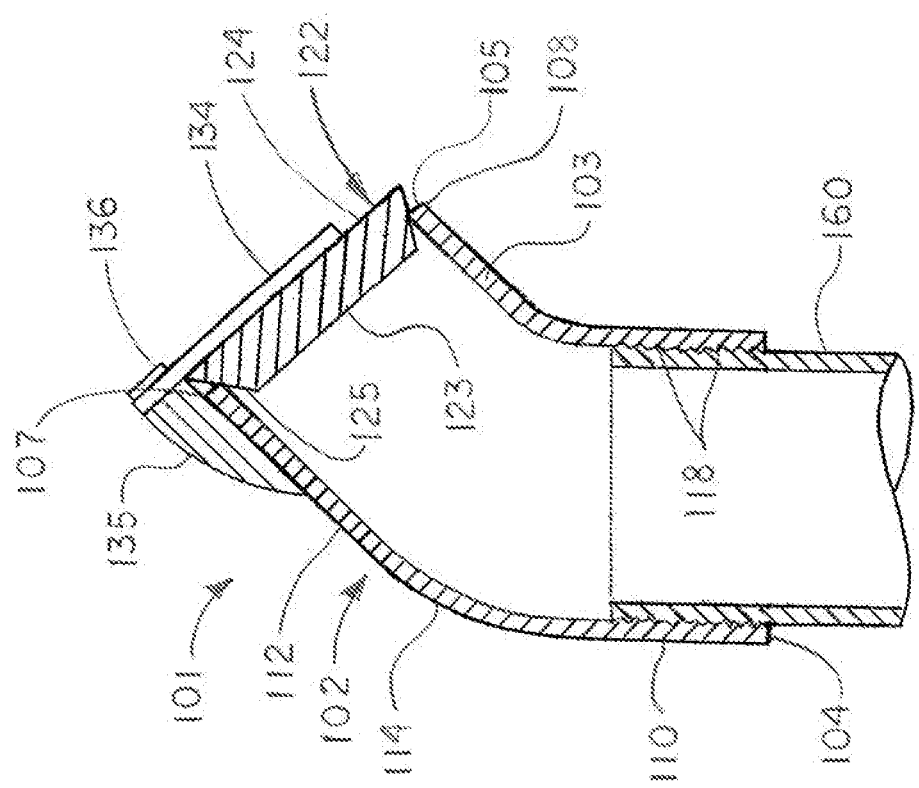
FIG. 11 is a longitudinal sectional view of the illustrative sure-seal cleanout conduit valve assembly illustrated in FIG. 8.

A valve body 22 may be pivotally attached to the valve housing 2 at the upper discharge opening side 7 of the valve discharge end 5. As illustrated in FIGS. 2 and 3, the valve body 22 may normally remain in a closed position to seal the valve discharge end 5. The angled or sloped configuration of the valve discharge end 5 may enable the weight of the valve body 22 to normally maintain the valve body 22 in the closed position to maintain the liquid-tight seal against the valve discharge end 5. In some embodiments, the valve body 22 may be maintained in the closed position against the valve discharge end 5 solely by the influence of gravity. As used herein, "solely by the influence of gravity" means that gravity is the only force which maintains the valve body 22 in a seated and sealing or closed position against the valve discharge end 5. As illustrated in FIG. 7, typically responsive to flow of overflow sewage 64 from the cleanout conduit 60 through the valve assembly 1, the valve body 22 may be opened typically against the influence of gravity to an open position in which the valve body 22 unseats from and unseals the valve discharge end 5 typically as will be hereinafter described. In other embodiments, a spring or other closure assistance mechanism (not illustrated) may additionally facilitate closure of the valve body 22 against the valve discharge end 5.

Figure 6:
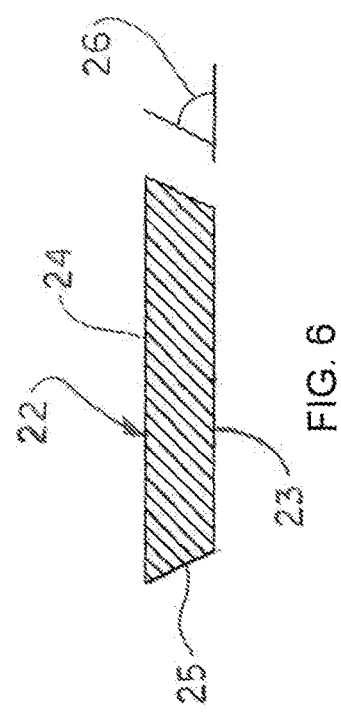
FIG. 6 is a cross-sectional view, taken along section lines 6-6 in FIG. 5, of the valve body.
Figure 5:
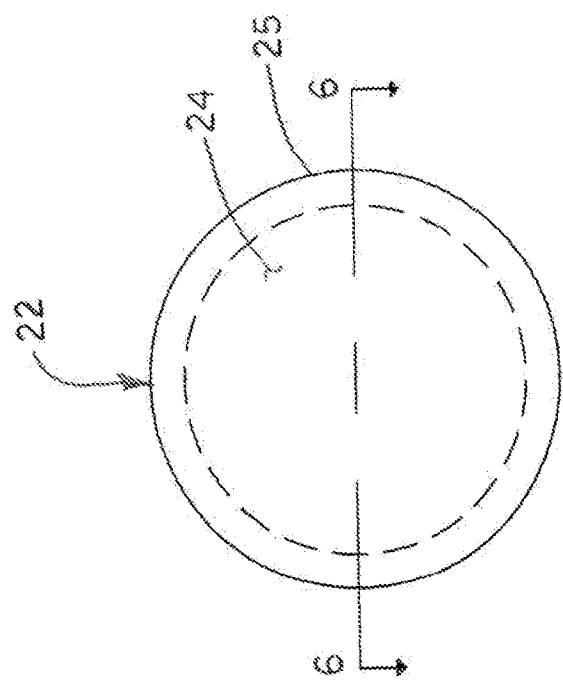
FIG. 5 is a top view of a typical plug-type valve body which is suitable for implementation of the sure-seal cleanout conduit valve assemblies.

As illustrated in FIGS. 5 and 6, in some embodiments, the valve plug valve body 22 may include an interior valve body surface 23. An exterior valve body surface 24 may extend in parallel, spaced-apart relationship to the interior valve body surface 23. A beveled sealing surface 25 may extend from the interior valve body surface 23 to the exterior valve body surface 24. As illustrated in FIG. 6, in some embodiments, the beveled sealing surface 25 may be disposed at a selected bevel angle 26 with respect to the exterior valve body surface 24. As further illustrated in FIG. 6, the beveled sealing surface 25 may have a uniformly beveled cross-sectional profile from the interior body surface 23 to the exterior body surface 24 of the valve body 22. In some embodiments, the bevel angle 26 may be about 63 degrees. As illustrated in FIGS. 3A and 3B, the inner wall edge 9 at the valve discharge end 5 of the valve housing wall 3 may have a diameter which is greater than that of the interior body surface 23 but less than that of the exterior body surface 24 of the valve body 22. Accordingly, in the closed position of the valve body 22, the beveled sealing surface 25 may wedge against or uniformly engage the inner wall edge 9 under the weight or gravitational pull of the valve body to establish and maintain a uniform and consistent seal with the valve discharge end 5. The beveled sealing surface 25 may thusly ensure a liquid-tight seal between the valve body 22 and the entire surface of the valve discharge end 5 when the valve body 22 is in the closed position. The valve plug valve body 22 may be fabricated of rubber, plastic and/or other resilient material known by those skilled in the art and may have a Shore hardness of about 60 Duro. In other embodiments, the valve body 22 may have alternative designs. In some embodiments, the valve body 22 may have a weight of at least about 1.0 lb.

Figure 4:
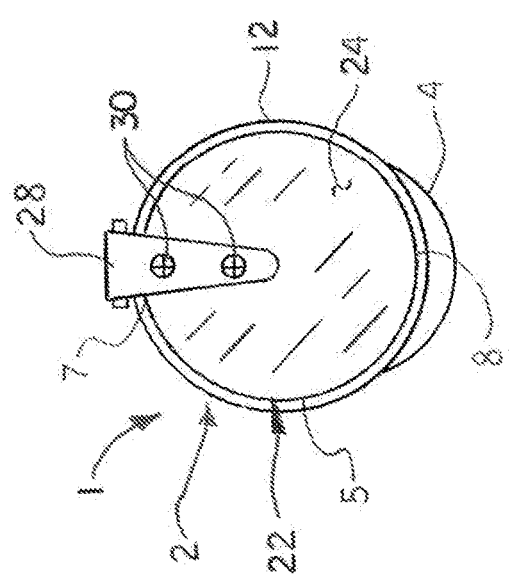
FIG. 4 is a top view of the illustrative sure-seal cleanout conduit valve assembly illustrated in FIG. 2.

The valve body 22 may be pivotally attached to the valve housing 2 according to the knowledge of those skilled in the art. Accordingly, in some embodiments, a valve hinge 28 may pivotally attach the valve body 22 to the valve housing 2 at the upper discharge opening side 7 of the valve discharge end 5 on the valve housing wall 3. As illustrated in FIG. 4, the valve hinge 28 may be attached to the valve body 22 and to the valve housing wall 3 of the valve housing 2 using suitable hinge fasteners 30. As illustrated in FIG. 3B, when the valve body 22 is in the closed position on the valve housing 2, the beveled sealing surface 25 of the valve body 22 may engage the inner wall edge 9 at the valve discharge end 5 of the discharge housing segment 12.

Referring to FIGS. 1-3 and 7 of the drawings, in typical application, the valve assembly 1 may be installed on the cleanout conduit 60. In some applications, the cleanout conduit 60 may extend from the sewer service line 51 in a vertical position or orientation into a cleanout conduit hole 56 which may extend into the ground surface 54 in front of, behind, adjacent to or otherwise in the vicinity of the building 50. A lining 57 may line the cleanout conduit hole 56. The sewer service line 51 may connect the sewage system (not illustrated) of the building 50 to the municipal sewer line 52. Accordingly, raw sewage 62 may normally flow from the sewage system of the building 50 through the sewer service line 51 to the municipal sewer line 52. The municipal sewer line 52 may convey the raw sewage 62 to a sewage treatment plant (not illustrated), typically in the conventional manner.

In some applications, the valve housing 2 of the valve assembly 1 may be coupled to the upper, discharge end 60a (FIG. 3) of the cleanout conduit 60 by engagement of interior housing threads 18 in the inlet housing segment 10 of the valve housing 2 with companion exterior cleanout conduit threads 61 on the cleanout conduit 60. In other embodiments, the valve housing 2 may be molded and/or otherwise fabricated in one piece with the cleanout conduit 60 and/or may be attached to the cleanout conduit 60 using alternative techniques known by those skilled in the art.

As illustrated in FIGS. 2 and 3, gravity may normally maintain the valve body 22 in a seated and sealing, closed position against the valve discharge end 5 of the valve housing 2. Accordingly, in the event of precipitation (not illustrated) or runoff of precipitation from the ground surface 54 (FIG. 1), the valve body 22 normally prevents entry of the precipitation and/or precipitation runoff into the valve interior 6 and cleanout conduit 60 such that the precipitation and/or runoff may fall instead into the cleanout conduit hole 56. Under heavy precipitation conditions, the precipitation may fill and overflow the cleanout conduit hole 56 and spill out onto the ground surface 54. However, the valve body 22 typically remains closed in the sealed position against the valve discharge end 5 of the valve housing 2 and continues to prevent entry of the rising precipitation into the cleanout conduit 60 through the valve interior 6. This expedient may prevent overflow sewage 64 (FIG. 7) from rising in the cleanout conduit 60 due to the entry of the precipitation and potentially overflowing the valve assembly 1, filling the cleanout conduit hole 56 and potentially flooding the ground surface 54.

In the event that a clog or blockage (not illustrated) obstructs the sewer service line 51 between the cleanout conduit 60 and the municipal service line 52, the raw sewage 62 may backflow in the sewer service line 51. Accordingly, as illustrated in FIG. 7, overflow sewage 64 may flow from the sewer service line 51 into the cleanout conduit 60 and through the valve interior 6 (FIG. 3) of the valve housing 2, lifting and unseating the valve body 22 from the valve discharge end 5 of the valve housing 2 and flowing typically into the cleanout conduit hole 56. The raw sewage 62 may subsequently be pumped or otherwise removed from the cleanout conduit hole 56. The clog or blockage may be removed from the sewer service line 51 using conventional methods and techniques. After flow of the raw sewage 62 through the sewer service line 51 is reestablished, the valve body 22 may subsequently close and seat against the valve discharge end 5, sealing the valve interior 6 and continuing to prevent flow of precipitation and runoff into the cleanout conduit 60 and sewer service line 51. Under heavy precipitation conditions, water may fill the cleanout conduit hole 56, and the weight of the water may exert a downward force on the valve body 22. Accordingly, due to the angled or sloped orientation of the valve body 22 on the valve housing 2, less flow pressure 66 (FIG. 7) of the overflow sewage 64 in the cleanout conduit 60 is required to open the valve body 22 than is the case with standard or conventional cleanout conduit relief valves having a valve body with a horizontal orientation.

It will be appreciated by those skilled in the art that the valve assembly 1 reliably prevents rainwater and other precipitation and runoff on the ground surface 54 from entering the cleanout conduit 60. This expedient prevents the precipitation and runoff from otherwise entering the sewer service line 51 and rising through the cleanout conduit 60, overflowing the valve assembly 1 and potentially flooding the cleanout conduit hole 56 and the ground surface 54. Standard or conventional relief valves for cleanout conduits have a spring-loaded valve body which engages a horizontal discharge surface. Consequently, when overflow of the cleanout conduit occurs, paper and other debris collects all around the discharge surface. This prevents the valve body from completely engaging and adequately sealing the discharge surface of the conventional relief valve. Referring again to FIG. 2, it has been found that orienting the valve discharge end 5 of the valve housing 2 at the discharge angle 32 relative to the horizontal plane 42 and closing the valve body 22 under the influence of gravity prevents paper and other debris from collecting around and clogging the valve discharge end 5 and interfering with the valve hinge 28 and otherwise preventing the valve body 22 from completely closing against and uniformly sealing the valve discharge end 5. Instead, any paper tends to collect toward the lower discharge opening side 8 of the valve discharge end 5 under the influence of gravity such that the beveled sealing surface 25 of the valve body 22 is capable of uniformly engaging and forming a liquid-tight seal with the valve discharge end 5. Moreover, it has been found that the weight of the valve body 22, in combination with the beveled orientation of the valve discharge end 5 and the weight of water pressure against the valve body 22, frequently enables the valve body 22 to cut through the collected paper and establish and maintain a uniform and consistent seal. This ensures uniform integrity of the liquid-tight seal-between the sealing surface 25 and the valve discharge end 5 and prevents the precipitation and runoff from entering the cleanout conduit 60 and causing the overflow sewage 64 to rise in the cleanout conduit 60 to potentially overflow the cleanout conduit hole 56 and ground surface 54. As illustrated in FIG. 3B the inner wall edge 9 at the valve discharge end 5 of the discharge housing segment 12 may form a cutting edge which cuts the paper and/or other debris as the paper or debris is trapped between the inner wall edge 9 and the beveled sealing surface 25 of the valve body 22.

It will be further appreciated by those skilled in the art that due to the angled or sloped orientation of the valve body 22 on the valve housing 2, less flow pressure 66 (FIG. 7) of the overflow sewage 64 in the cleanout conduit 60 is required to open the valve body 22 than is the case with standard or conventional cleanout conduit relief valves having a valve body with a horizontal orientation. Thus, the valve body 22 is capable of opening against the weight of water which may fill the cleanout conduit hole 56 under heavy precipitation conditions such that the flow pressure 66 of the overflow sewage 64 in the cleanout conduit 60 can more easily open the valve body 22 against the weight of the water. The overflow sewage 64 can thus discharge from the valve discharge end 5, thereby preventing the overflow sewage 64 from backing up in the sewer service line 51 into the building 50.

Referring next to FIGS. 8-11 of the drawings, an alternative illustrative embodiment of the cleanout conduit valve assemblies is generally indicated by reference numeral 101. In the valve assembly 101, elements which are analogous to the respective elements of the valve assembly 1 that was heretofore described with respect to FIGS. 1-7 are designated by the same respective numerals in the 101-199 series in FIGS. 8-11. The valve assembly 101 may include a flexible valve connector 134 which connects the valve body 122 to the valve housing 122. The flexible valve connector 134 may include an elongated strip of flexible material such as rubber, for example and without limitation. A flap mount 135 may extend from the exterior surface of the valve housing 102 at the valve discharge end 105. The flexible valve connector 134 may be secured between the flap mount 135 and a flap mount plate 136. As illustrated in FIG. 9, at least one flap mount fastener 137 may extend through registering fastener openings (not illustrated) in the flap mount plate 136 and the underlying flexible valve connector 134, respectively, and threaded into a registering fastener opening (not illustrated) in the flap mount 135 to mount the flexible valve connector 134 on the valve housing 102. The valve body 122 may be attached to the flexible valve connector 134 using adhesives, fasteners and/or other suitable attachment technique known by those skilled in the art.

Typical application of the valve assembly 101 may be as was heretofore described with respect to the valve assembly 1 in FIGS. 1-3 and 7. Accordingly, as illustrated in FIGS. 8 and 9, the flexible valve connector 134 may facilitate closing of the valve body 122 on the valve discharge end 105 typically under the influence of gravity. As illustrated in FIG. 10, the flexible valve connector 134 may facilitate opening of the valve body 122 on the valve discharge end 105 of the valve housing 102 responsive to flow of the overflow sewage 164 from the cleanout conduit 160 through the valve assembly 101.

Figure 12:
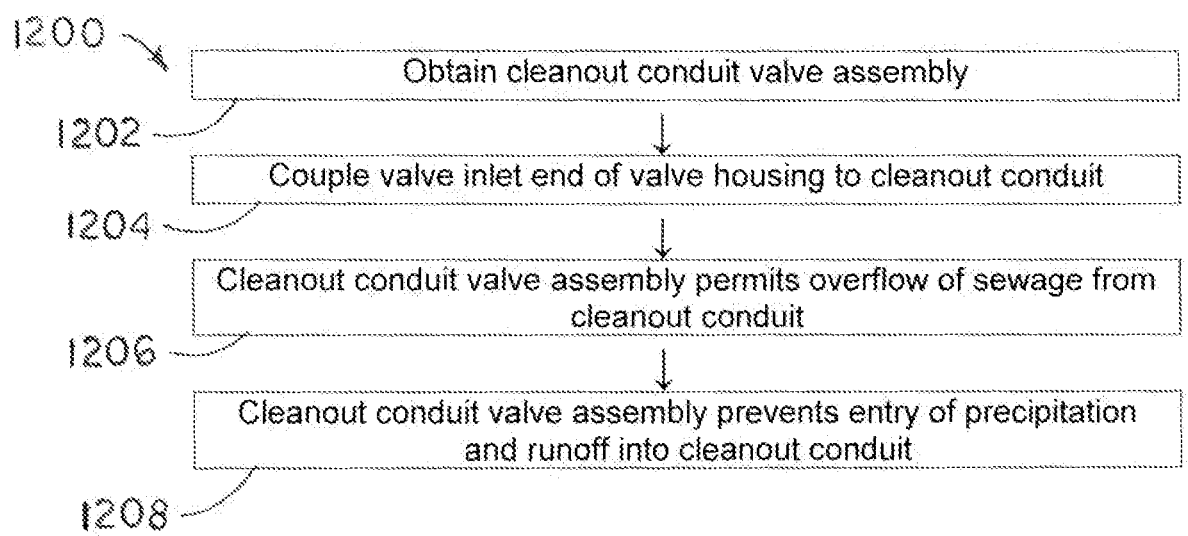
FIG. 12 is a flow diagram of an illustrative embodiment of the sure-seal cleanout methods.

Referring next to FIG. 12 of the drawings, a flow diagram 1200 of an illustrative embodiment of the sure-seal cleanout methods is illustrated. At Step 1202, a cleanout conduit valve assembly may be obtained. In some embodiments, the cleanout conduit valve assembly may have a design which is the same as or similar to that of the valve assembly 1 heretofore described with respect to FIGS. 1-7. In some embodiments, the cleanout conduit valve assembly may have a design which is the same as or similar to that of the valve assembly 101 heretofore described with respect to FIGS. 8-11.

At Step 1204, a valve inlet end of the valve housing of the valve assembly may be coupled to the cleanout conduit. In some embodiments, the valve inlet end of the valve housing may be threadably attached to the cleanout conduit. In some embodiments, the valve inlet end may be attached to the cleanout conduit using other techniques known by those skilled in the art. In some embodiments, the valve inlet end may be integrally attached to the cleanout conduit using molding and/or other fabrication techniques known by those skilled in the art.

At Step 1206, in the open position, the cleanout conduit valve assembly may permit overflow of sewage from the cleanout conduit.

At Step 1208, in the closed position, the cleanout conduit valve assembly may prevent entry of precipitation and runoff into the cleanout conduit.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A method of preventing precipitation and runoff on a ground surface from entering a cleanout conduit connected to a sewer service line, comprising:
    obtaining a cleanout conduit valve assembly including:
        a vertically oriented valve housing having a valve housing wall comprising:
            a valve inlet end;
            a valve discharge end opposite to and generally above the valve inlet end; and
            an interior valve housing wall surface extending from the valve inlet end to the valve discharge end, the interior valve housing wall surface perpendicular to the valve discharge end, the valve discharge end oriented within a valve discharge plane disposed at a discharge angle of greater than 0 degrees with respect to a horizontal plane and having an uppermost discharge opening side and a lowermost discharge opening side sloped downwardly from the uppermost discharge opening side, the valve discharge end having a non-beveled, terminal inner wall edge defining a sharp transition between the valve discharge end and the interior valve housing wall surface; and
        a valve body pivotally carried by the valve housing along a horizontal pivot axis exclusively at the uppermost discharge opening side of the valve discharge end and positional in a closed position and an open position, the valve body having an interior valve body surface having a diameter less than a diameter of the inner wall edge, an exterior valve body surface having a diameter greater than the diameter of the inner wall edge and a uniformly beveled sealing surface extending from the interior valve body surface to the exterior valve body surface, the uniformly beveled sealing surface uniformly engaging the inner wall edge of the valve discharge end in the closed position of the valve body, whereby the inner wall edge is configured to cut debris trapped between the valve discharge end of the valve housing and the valve body and establish and maintain a uniform and consistent seal in the closed position of the valve body; and
        coupling the valve inlet end of the valve housing to the cleanout conduit.

2. The method of claim 1 wherein obtaining the cleanout conduit valve assembly including the valve body pivotally carried by the valve housing comprises obtaining the cleanout conduit valve assembly including the valve body normally maintained solely by influence of gravity in a closed position sealing the valve discharge end and openable against gravity to an open position unsealing the valve discharge end.

3. The method of claim 1 wherein obtaining the cleanout conduit valve assembly having the valve body pivotally carried by the valve housing comprises obtaining the cleanout conduit valve assembly having a valve plug including the interior valve body surface, the exterior valve body surface and the uniformly beveled sealing surface extending from the interior valve body surface to the exterior valve body surface pivotally carried by the valve housing.

4. The method of claim 1 wherein obtaining the cleanout conduit valve assembly having the valve discharge end oriented within the valve discharge plane disposed at the discharge angle of greater than 0 degrees with respect to the horizontal plane comprises obtaining the cleanout conduit valve assembly having the valve discharge end oriented within a valve discharge plane disposed at a discharge angle of at least about 10 degrees with respect to the horizontal plane.

5. The method of claim 1 wherein obtaining the cleanout conduit valve assembly having the valve body pivotally carried by the valve housing comprises obtaining the cleanout conduit valve assembly having a valve hinge pivotally attaching the valve body to the valve housing.

6. The method of claim 1 wherein obtaining the cleanout conduit valve assembly having the valve body pivotally carried by the valve housing comprises obtaining the cleanout conduit valve assembly having a flexible valve connector pivotally attaching the valve body to the valve housing.

7. The method of claim 1 wherein obtaining the cleanout conduit valve assembly including the vertically oriented valve housing comprises obtaining the cleanout conduit valve assembly including the vertically oriented valve housing having the valve inlet end of the valve housing disposed within a horizontal valve inlet plane.

8. The method of claim 1 wherein obtaining the cleanout conduit valve assembly including the vertically oriented valve housing comprises obtaining the cleanout conduit valve assembly including the vertically oriented valve housing having the valve housing wall forming an inlet housing segment, a discharge housing segment disposed at the discharge angle to the inlet housing segment and an angled intermediate housing segment connecting the discharge housing segment to the inlet housing segment, and the valve inlet end terminates the inlet housing segment and the valve discharge end terminates the discharge housing segment of the valve housing.

9. A method of preventing precipitation and runoff on a ground surface from entering a cleanout conduit connected to a sewer service line and extending within a subterranean cleanout conduit hole, comprising:
    obtaining a cleanout conduit valve assembly including:
        a vertically oriented valve housing having a valve housing wall comprising:
            a valve inlet end;
            a valve discharge end opposite to and generally above the valve inlet end; and
            an interior valve housing wall surface extending from the valve inlet end to the valve discharge end, the interior valve housing wall surface perpendicular to the valve discharge end, the valve discharge end oriented within a valve discharge plane disposed at a discharge angle of from about 35 degrees to about 55 degrees with respect to a horizontal plane and having an uppermost discharge opening side and a lower discharge opening side sloped downwardly from the uppermost discharge opening side, the valve discharge end having a non-beveled terminal inner wall edge defining a sharp transition between the valve discharge end and the interior valve housing wall surface; and
        a valve body having a weight of at least about 1.0 lb, pivotally carried by the valve housing along a horizontal pivot axis exclusively at the uppermost discharge opening side of the valve discharge end and positional in a closed position and an open position, the valve body including an interior valve body surface having a diameter less than a diameter of the inner wall edge, an exterior valve body surface having a diameter greater than the diameter of the inner wall edge and a uniformly beveled sealing surface extending from the interior valve body surface to the exterior valve body surface, the valve body normally maintained solely by influence of gravity in the closed position sealing the valve discharge end and openable against gravity to the open position unsealing the valve discharge end, the uniformly beveled sealing surface uniformly engaging the inner wall edge of the valve discharge end in the closed position of the valve body, whereby the inner wall edge is configured to cut debris trapped between the valve discharge end of the valve housing and the valve body and establish and maintain a uniform and consistent seal in the closed position of the valve body; and coupling the valve inlet end of the valve housing to the cleanout conduit.

10. The method of claim 9 wherein obtaining the cleanout conduit valve assembly including the valve body pivotally carried by the valve housing comprises obtaining the cleanout conduit valve assembly including the valve body normally maintained solely by influence of gravity in a closed position sealing the valve discharge end and openable against gravity to an open position unsealing the valve discharge end.

11. The method of claim 9 wherein obtaining the cleanout conduit valve assembly having the valve body pivotally carried by the valve housing comprises obtaining the cleanout conduit valve assembly having valve plug including the interior valve body surface, the exterior valve body surface and the uniformly beveled sealing surface extending from the interior valve body surface to the exterior valve body surface pivotally carried by the valve housing.

12. The method of claim 9 wherein obtaining the cleanout conduit valve assembly having the valve discharge end oriented within the valve discharge plane disposed at the discharge angle of from about 35 degrees to about 55 degrees with respect to the horizontal plane comprises obtaining the cleanout conduit valve assembly having the valve discharge end oriented within a valve discharge plane disposed at a discharge angle of about 45 degrees with respect to the horizontal plane.

13. The method of claim 9 wherein obtaining the cleanout conduit valve assembly having the valve body pivotally carried by the valve housing comprises obtaining the cleanout conduit valve assembly having a valve hinge pivotally attaching the valve body to the valve housing.

14. The method of claim 9 wherein obtaining the cleanout conduit valve assembly having the valve body pivotally carried by the valve housing comprises obtaining the cleanout conduit valve assembly having a flexible valve connector pivotally attaching the valve body to the valve housing.

15. The method of claim 9 wherein obtaining the cleanout conduit valve assembly including the vertically oriented valve housing comprises obtaining the cleanout conduit valve assembly including the vertically oriented valve housing having the valve inlet end of the valve housing disposed within a horizontal valve inlet plane.

16. The method of claim 9 wherein obtaining the cleanout conduit valve assembly including the vertically oriented valve housing comprises obtaining the cleanout conduit valve assembly including the vertically oriented valve housing having a valve housing wall forming an inlet housing segment, a discharge housing segment disposed at the discharge angle to the inlet housing segment and an angled intermediate housing segment connecting the discharge housing segment to the inlet housing segment, and the valve inlet end terminates the inlet housing segment and the valve discharge end terminates the discharge housing segment of the valve housing.

17. A cleanout conduit valve assembly for a cleanout conduit, comprising:
 a vertically oriented valve housing having a valve housing wall including:
  a valve inlet end configured to be disposed in fluid communication with the cleanout conduit;
  a valve discharge end opposite to and generally above the valve inlet end; and
  an interior valve housing wall surface extending from the valve inlet end to the valve discharge end, the interior valve housing wall surface perpendicular to the valve discharge end, the valve discharge end oriented within a valve discharge plane disposed at a discharge angle of greater than 0 degrees and less than 90 degrees with respect to a horizontal plane and having an uppermost discharge opening side and a lowermost discharge opening side sloped downwardly from the uppermost discharge opening side, the valve discharge end having a non-beveled, terminal inner wall edge defining a sharp transition between the valve discharge end and the interior valve housing wall surface; and
 a valve body having a weight of at least about 1.0 lb, pivotally carried by the valve housing along a horizontal pivot axis exclusively at the uppermost discharge opening side of the valve discharge end and positional in a closed position and an open position, the valve body including an interior valve body surface having a diameter less than a diameter of the inner wall edge, an exterior valve body surface having a diameter greater than the diameter of the inner wall edge and a uniformly beveled sealing surface extending from the interior valve body surface to the exterior valve body surface, the uniformly beveled sealing surface engaging the inner wall edge of the valve discharge end in the closed position of the valve body, whereby the inner wall edge is configured to cut debris trapped between the valve discharge end of the valve housing and the valve body and establish and maintain a uniform and consistent seal in the closed position of the valve body.

18. The cleanout conduit valve assembly of claim 17 wherein the valve body is normally maintained solely by influence of gravity in a closed position sealing the valve discharge end and openable against gravity to an open position unsealing the valve discharge end.

19. The cleanout conduit valve assembly of claim 17 wherein the valve body comprises a valve plug having the interior valve body surface, the exterior valve body surface and the uniformly beveled sealing surface extending from the interior valve body surface to the exterior valve body surface.

20. The cleanout conduit valve assembly of claim 17 wherein the discharge angle is at least about 10 degrees.

* * * * *